United States Patent [19]

Ohno

[11] Patent Number: 5,995,298
[45] Date of Patent: Nov. 30, 1999

[54] ZOOM LENS

[75] Inventor: Kazunori Ohno, Omiya, Japan

[73] Assignee: Fuji Photo Optical Co., Ltd., Omiya, Japan

[21] Appl. No.: 09/100,097

[22] Filed: Jun. 19, 1998

[30] Foreign Application Priority Data

Jul. 4, 1997 [JP] Japan .................................. 9-194867

[51] Int. Cl.$^6$ .................................................. G02B 15/14
[52] U.S. Cl. .......................................................... 359/692
[58] Field of Search ...................... 369/691, 692

[56] References Cited

U.S. PATENT DOCUMENTS 4,991,945  2/1991  Estelle ..................................... 359/692
5,270,861  12/1993  Estelle ..................................... 359/676

FOREIGN PATENT DOCUMENTS 3-127013   5/1991   Japan .
3-158815   7/1991   Japan .
7-294815   11/1995  Japan .

*Primary Examiner*—Georgia Epps
*Assistant Examiner*—Ricky Mack
*Attorney, Agent, or Firm*—Arnold International; Bruce Y. Arnold

[57] ABSTRACT

An inexpensive, compact, high performance zoom lens which has excellent production adaptability is disclosed. The zoom lens has a front lens group of positive refractive power which includes a negative lens element having a concave aspheric surface on the object-side, and a positive lens element having a convex surface on the image-side. The rear lens group consists of a negative lens element. A stop is arranged between the negative lens element and the positive lens element in the front lens group, and the following conditional formulas (1)–(3) are satisfied:

$$0.40 < f_2/f_w < 0.50 \qquad (1)$$

$$0.01 < D_2/f_w < 0.05 \qquad (2)$$

$$-0.20 < R_4/R_3 < 0.0 \qquad (3)$$

where
  $f_2$ is the focal distance of the positive lens element in the front lens group,
  $f_w$ is the focal distance of the zoom lens at the maximum wide-angle state,
  $D_2$ is the distance between the acing surfaces of the negative lens element and the positive lens element in the front lens group,
  $R_3$ is the radius of curvature of the object-side surface of the positive lens element in the front lens group, and
  $R_4$ is the radius of curvature of the image-side surface of the positive lens element in the front lens group.

10 Claims, 12 Drawing Sheets

EMBODIMENT 1

ZOOM LENS

BACKGROUND OF THE INVENTION

In recent years, there has been a strong demand for inexpensive zoom lens shutter cameras which have good portability (i.e., are small and light weight), which in turn requires the zoom lenses installed in the cameras be small, inexpensive, and of high performance. Examples of relatively inexpensive zoom lenses with simple structures having three lens elements are disclosed in Japanese Laid-Open Patent Publication 3-127013, Japanese Laid-Open Patent Publication 3-158815 and Japanese Laid-Open Patent Publication 7-294815.

However, zoom lenses of the aforementioned Japanese laid-open patent publications use expensive, aspherical molded-glass lens elements, are too large due to a long distance between each lens element in the front lens group, or the ease of production is not good, even when inexpensive plastic lenses are used, due to the use of many aspherical surfaces. Thus the prior art zoom lenses often fail to meet the market demand.

In the zoom lenses of the aforementioned Japanese laid-open patent publications, a negative lens element is arranged on the object-side of the front lens group. However, the refractive power of each zoom lens is made small by having the distance between the negative lens element and the positive lens element be large, or the aberration corrections are made easier by arranging a stop behind the positive lens element. In either case, the zoom lens fails to satisfy the market demand for a compact system, since the zoom lens becomes longer or the diameter of the front lens element of the zoom lens becomes larger than is necessary.

BRIEF SUMMARY OF THE INVENTION

The present invention relates to a zoom lens, in particular, a zoom lens which is ideal for a lens shutter camera. Considering the situations described above, the present invention aims to provide a small, inexpensive, high performance zoom lens having a 3-piece structure including a positive lens group and a negative lens group, and which improves the ease of production by minimizing the number of aspherical surfaces that are employed in the zoom lens.

The zoom lens of the present invention is of the telephoto type, wherein the lens system is divided into a front lens group and a rear lens group. This enables the length of the zoom lens to be shortened, and also enables each conditional formula, as described further below, to be satisfied using lens elements of preferred shapes.

BRIEF DESCRIPTION OF THE DRAWINGS

The present invention will become more fully understood from the detailed description given below and the accompanying drawings, which are given by way of illustration only and thus are not intended to limit the scope of the present invention, and wherein.

DETAILED DESCRIPTION

Figure 1:
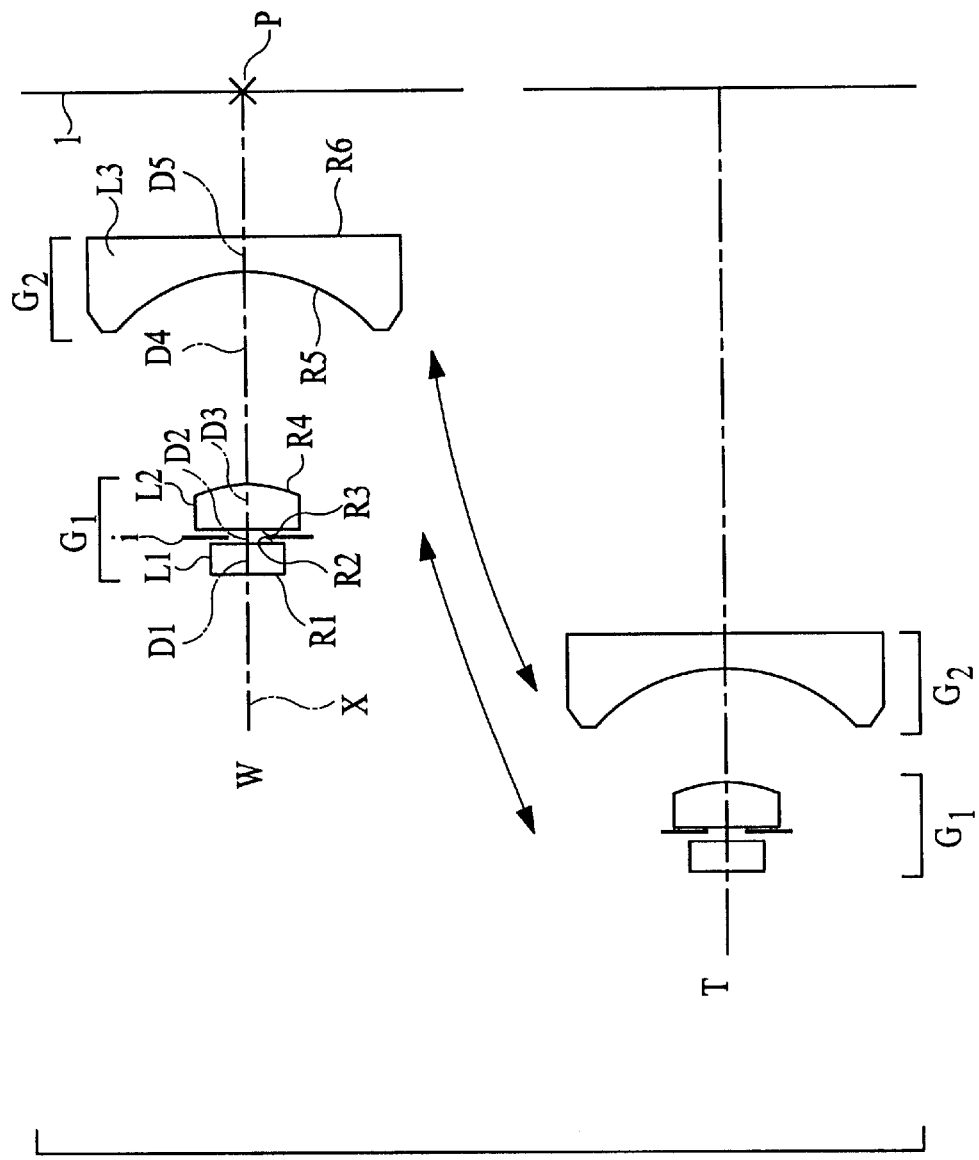
FIG. 1 is a schematic diagram illustrating the basic lens structure in the maximum wide-angle state (W) and the maximum telephoto state (T), as well as the movement path of the lens groups of embodiment 1 of the present invention.

Referring to FIG. 1, the zoom lens of the present invention includes, in order from the object-side: a front lens group $G_1$ having positive refractive power and a rear lens group $G_2$ having negative refractive power wherein zooming is accomplished by changing the distance between the front lens group and the rear lens group. The front lens group includes a negative lens element $L_1$ with an aspherical concave surface on the object-side and a positive lens element $L_1$ with a convex surface on the image-side, and the rear lens group includes only a negative lens element L3 with a concave surface on the object-side. A stop "i" is arranged between the negative lens element $L_1$ and the positive lens element L2, and the following conditional formulas (1)–(3) are satisfied:

$$0.40 < f_2/f_w < 0.50 \quad (1)$$

$$0.01 < D_2/f_w < 0.05 \quad (2)$$

$$-0.20 < R_4/R_3 < 0.0 \quad (3)$$

where
 $f_w$ is the focal distance of the zoom lens at the maximum wide-angle state,
 $f_2$ is the focal distance of the positive lens element $L_2$,
 $R_3$ is the radius of curvature of the object-side surface of the positive lens element $L_2$,
 $R_4$ is the radius of curvature of the image-side surface of the positive lens element $L_2$, and
 $D_2$ is the distance between the facing surfaces of the negative lens element $L_1$ and the positive lens element $L_2$.

Moreover both surfaces of the negative lens element $L_3$ are preferably spherical surfaces, and the radius of curvature of the object-side surface $R_5$ of negative lens element $L_3$ and the focal length of the zoom lens $f_w$ at the maximum wide-angle state preferably satisfy the following conditional formula (4)

$$-0.45 < R_5/f_w < -0.35 \qquad (4)$$

where $R_5$ is the radius of curvature of the object-side surface of the negative lens element in the rear lens group, and $f_w$ is as defined above.

Figure 2:
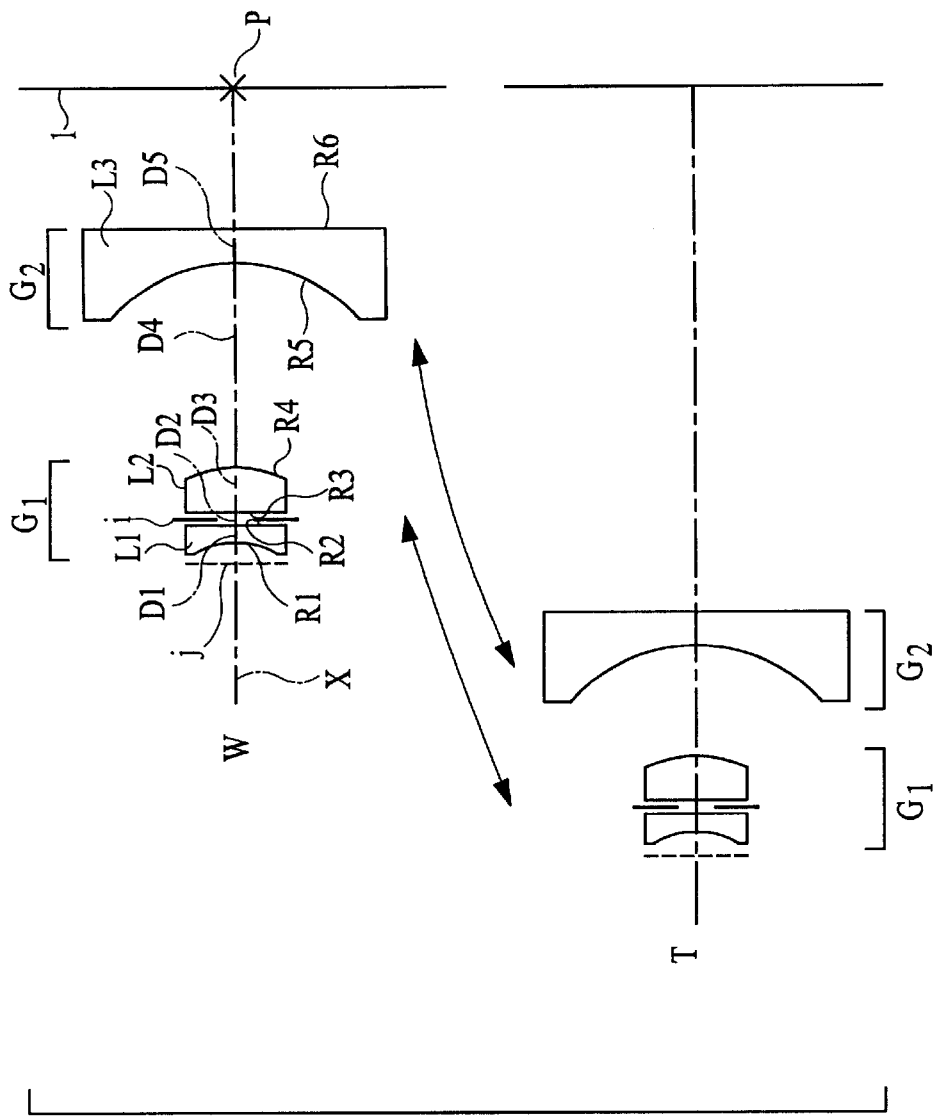
FIG. 2 is a schematic diagram illustrating the basic lens structure in the maximum wide-angle state and the maximum telephoto state, as well as the movement path of the lens groups of embodiment 2 of the present invention.

All of the three lenses $L_1$, $L_2$, and $L_3$ are preferably made of organic material. Furthermore, the stop "i" is preferably a fixed stop, and a variable stop "j", as shown in FIG. 2, is preferably arranged at the immediate object-side of the negative lens element $L_1$.

In a zoom lens comprising a front lens group having positive refractive power and a rear lens group having negative refractive power where zooming is accomplished by changing the distance between these two lens groups, the image from the front lens group is, in general, enlarged by the rear lens group. Hence, it is indispensable that the imaging performance of the front lens group has particularly small spherical aberrations and chromatic aberrations. Moreover, in a zoom lens where the front lens group comprises two lens elements of opposite power and the rear lens group consists of only a single element, it is necessary to provide symmetry in refractive power distribution for the zoom lens. Since the rear lens element in the present invention has negative refractive power, it is desirable to arrange the negative lens element of the front lens group on the object-side and the positive lens element of the front lens group on the image-side, respectively, of the front lens group. However, because the front lens group as a whole has positive refractive power, it is vital to make the refractive power of the positive lens element much stronger than the refractive power of the negative lens element, and aberration corrections must be considered for the positive lens element.

In the present invention, a compact design is achieved by making the distance between the negative lens element $L_1$ and the positive lens element $L_2$ in the front lens group $G_1$ be extremely small. Moreover, problems associated with correction of aberrations caused by the mutual strengthening of the refractive power of both the negative lens element $L_1$ and the positive lens element $L_2$ in the front lens group resulting from the compact design are resolved by arranging a stop "i" within the small space between the negative lens element $L_1$ and the positive lens element $L_2$ in the front lens group. In fact, the occurrence of coma aberrations and chromatic aberrations of magnification (lateral color) is controlled by making the height of off-axis light rays entering or exiting each of lenses $L_1$ and $L_2$ low. Moreover, in order to offset enormous spherical aberrations (due to the strong refractive power of the positive lens element $L_2$), and a strong divergent effect (due to the negative lens element L3 in the rear lens group) for the off-axis light rays, particularly at the wide-angle side where the distance between the lens groups is large, the surface facing the object-side of negative lens element $L_1$ in the first lens group is made to be a concave surface with strong curvature, thereby enabling the spherical aberration, curvature of field, and distortion of the zoom lens to be relatively small.

Because of how the lens shutter is positioned, a certain amount of space must be allowed for the lens shutter when the zoom lens is in the maximum telephoto state, where the distance between the lens groups is small. This makes it necessary to further strengthen the refractive power of each lens group, resulting in the aforementioned aberration corrections no longer being sufficient. Hence, by making the concave surface on the object-side of negative lens element $L_1$ be aspherical so as to increase the divergence toward the perimeter of the lens, favorable corrections to curvature of field and distortion are achieved.

However, the aspherical surface produces a stronger divergence and makes the spherical aberration extremely large in the positive direction. Hence, making the image-side surface of the positive lens element $L_2$ be a convex surface having a strong curvature (so as to control the spherical aberrations in the front lens group to be small) enables the spherical aberrations of the lens elements to be balanced so as to produce, overall, small spherical aberration for the zoom lens system while maintaining small curvature of field.

Conditional formulas (1)–(3), above, are provided to make the requirements, described above, of the lens element surfaces more tangible. These conditional formulas enable the zoom lens performance to be maintained at a high level while allowing the zoom lens to be made smaller and the production costs of the component lens elements to be lowered.

Conditional formula (1) regulates the refractive power of the positive lens element $L_2$ in the front lens group. With this conditional formula, distribution of refractive power for the zoom lens is optimized. In fact, if the value of $f_2/f_w$, where $f_w$ is the focal distance of the zoom lens and $f_2$ is the focal distance of the positive lens element $L_2$ in the front lens group, is smaller than the lower limit of conditional formula (1), the refractive power of the positive lens element $L_2$ becomes even stronger, and the axial chromatic aberration is further improved in connection with the negative lens element $L_1$. On the other hand, however, the refractive power of the negative lens element $L_1$ also becomes large and the effect on imaging performance due to small centering errors in positioning the negative lens element $L_1$ becomes too large. This necessitates aberration correction through an increase in the number of aspherical surfaces. As a result, precision of parts must be more strictly observed, presenting a major problem in production.

If the refractive power of both the front lens group and rear lens group becomes strong in relation to the refractive power of the front and rear lens groups of the aforementioned conditional formula (1), the length of the zoom lens becomes shorter, which is advantageous for is the compact design of the lens system. However, aberration fluctuation over the entire range of zoom become large and the imaging performance may no longer be favorably maintained, which is unacceptable from a performance point of view.

On the other hand, if the value of $f_2/f_w$ is larger than the upper limit of conditional formula (1), the refractive power of the positive lens element $L_2$ becomes too weak, the negative refractive power of the negative lens element $L_1$ also becomes weak, and the achromatism becomes insufficient. In order to improve achromatism, the distance between the negative lens element $L_1$ and the positive lens element $L_2$ must be enlarged, which results in an enlargement of the zoom lens and may present a problem for a compact design, even though performance may be improved.

Moreover, smaller refractive power of the front lens group and the rear lens group is advantageous for aberration correction, but the amount of movement needed of the front lens group and the rear lens group in zooming increases, resulting in an enlargement of the zoom lens, which may also present a problem for a compact design.

Conditional formula (2) relates to the distance $D_2$ between the negative lens element $L_1$ and the positive lens element $L_2$ in the front lens group and is designed to optimize the balance between the compactness and the imaging performance of the zoom lens.

If the value of $D_2/f_w$ is smaller than the lower limit of conditional formula (2), the distance $D_2$ becomes small, making it possible to shrink the length of the zoom lens. On the other hand, the negative lens element $L_1$ becomes closer to the aperture stop, causing the incident height of the off-axis light rays onto the negative lens element $L_1$ to become low, thereby reducing the strong divergent effect of the negative lens element $L_1$ and deteriorating the curvature of field and distortion due to an increase in asymmetry of refractive power distribution over the zoom lens. Hence, it becomes necessary to further increase the divergence property of the aspherical surface on the object-side of negative lens element $L_1$ However, because the incident height of the off-axis light rays is lower than that of the central light rays, there is a deterioration of the spherical aberration as well as a deterioration of the curvature of field correction. For this reason, it is possible to make the center section of the negative lens element $L_1$ thicker or to make both sides of the negative lens element $L_1$ be aspherical surfaces, but precision becomes difficult to achieve in either case, which becomes a major problem in production.

On the other hand, if the value of $D_2/f_w$ becomes larger than the upper limit of conditional formula (2), the distance $D_2$ becomes too large, which in turn causes the length of the zoom lens to be too long and destroys the compactness of the system, even though a large $D_2$ is advantageous for correcting aberrations. Moreover, the divergence effect becomes excessive, which makes the refractive power of both the negative lens element $L_1$ and the positive lens element $L_2$ too small, resulting also in the possibility for a compact design being eliminated.

Conditional formula (3) defines a relationship between the radii of curvature $R_3$ and $R_4$ of the front and the rear surfaces of the positive lens element $L_2$ in the front lens group. The conditional formula (3) aims particularly to achieve balance between spherical aberration and curvature of field when conditional formulas (1) and (2) are satisfied.

If the ratio $R_4/R_3$ of the radii of curvature of the front and the rear surfaces of the positive lens element $L_2$ is smaller than the lower limit of conditional formula (3), a strong convergence effect of the image-side surface of the positive lens element $L_2$, which is a convex surface with strong curvature, is eased too much, causing the curvature of field to become too large even though the spherical aberration becomes small, and a favorable imaging relationship for the entire image field will not be established. On the other hand, if the value of $R_4/R_3$ is larger than the upper limit of conditional formula (3), the spherical aberration becomes too large and the imaging performance in the central area of the image field deteriorates too much, resulting in unacceptable performance.

Moreover, the rear lens group of the zoom lens of the present invention comprises only one negative lens element. Hence, balance between the two types of aberrations (spherical aberration and curvature of field) is achieved, which is necessary for uniform imaging performance over the entire image field throughout the full range of zooming.

In other words, in the case of a zoom lens of two lens groups (of positive-negative construction), the role of the rear lens group is to enlarge and form the image created by the front lens group at a predetermined image field, but in the maximum wide-angle state, the distance between the front lens group and the rear lens group is long and the back focus between the rear lens group and the imaging surface is short. Conversely, in the maximum telephoto state, the distance between the two lens groups is small and the back focus is long. In addition, the stop is located between the negative lens element $L_1$ and the positive lens element $L_2$ of the front lens group; hence, when in the maximum wide-angle state, the height of the central light rays is small and the height of the off-axis light rays is large when observed from the rear lens group. On the other hand, when in the maximum telephoto state, the height of the central light rays is large and the height of the off-axis light rays is small. Hence, during the maximum wide-angle state, off-axis aberrations such as curvature of field and distortion become large, while spherical aberrations become large during the maximum telephoto state, causing imagig performance of the zoom lens to deteriorate. It becomes necessary to hold each aberration small by using a single negative lens element $L_3$.

In order to make the negative lens element $L_3$ inexpensive to produce, it becomes necessary to form the front and rear surfaces using a spherical surface. In fact, the negative lens element $L_3$ in the rear lens group needs to make the off-axis aberrations small during the maximum wide-angle state. Hence it is necessary to form the object-side surface of the negative lens element $L_3$ in such a manner that the center of curvature thereof is located near the exit pupil of the front lens group. For this reason, the object-side surface of the negative lens element $L_3$ must be a concave surface having strong curvature. However, during the maximum telephoto state, when the spherical aberration becomes large, the smaller value is the radius of curvature of the object-side surface of negative lens element $L_3$, while the larger value is the spherical aberration. Considering these situations, the conditional formula (4) is designed to define the range in which both the off-axis aberrations (when in the maximum wide-angle state) and the spherical aberration (when in the maximum telephoto state) are held to be small.

If the value of $R_5/f_w$ is smaller than the lower limit of conditional formula (4), corrections of off-axis aberrations at the maximum wide-angle state become difficult even though the spherical aberration at the maximum telephoto state becomes small. Thus, problems arise with the picture quality deteriorating near the perimeter of the image field. Conversely, if the value of $R_5/f_w$ is larger than the upper limit of conditional formula (4), spherical aberrations at the maximum telephoto state become too large, even though it becomes very easy to correct off-axis aberrations.

Moreover, if each of the negative lens element $L_1$, the positive lens element $L_2$ and the negative lens element $L_3$ are made of organic material, as described above, a large reduction in the production cost is achieved. Moreover, in the zoom lens of the present invention, the distance between the negative lens element $L_1$ and the positive lens element $L_2$ in the front lens group is made small in order to make the zoom lens compact; however, if a variable stop mechanism for adjustment of the amount of light cannot be inserted within the space $D_2$ between the two lens elements, then a fixed stop may instead be inserted in the interval $D_2$, and a variable stop mechanism may be provided immediately adjacent the object-side of negative lens element $L_1$ in the case where a small stop is still needed for adjustment of the amount of light. Moreover, it is possible to attach a lens shutter mechanism to this variable stop mechanism.

It is also possible to arrange the variable stop mechanism to the rear of the front lens group. However, this may cause the image performance near the perimeter of the image field to deteriorate slightly, but not enough to present any practical problem. It is also clear that providing a fixed stop in the interval $D_2$ alone functions sufficiently well for the zoom lens to be used as a camera lens.

Hereinafter, embodiments of the present invention will be described with reference to the drawings.

Figure 3:
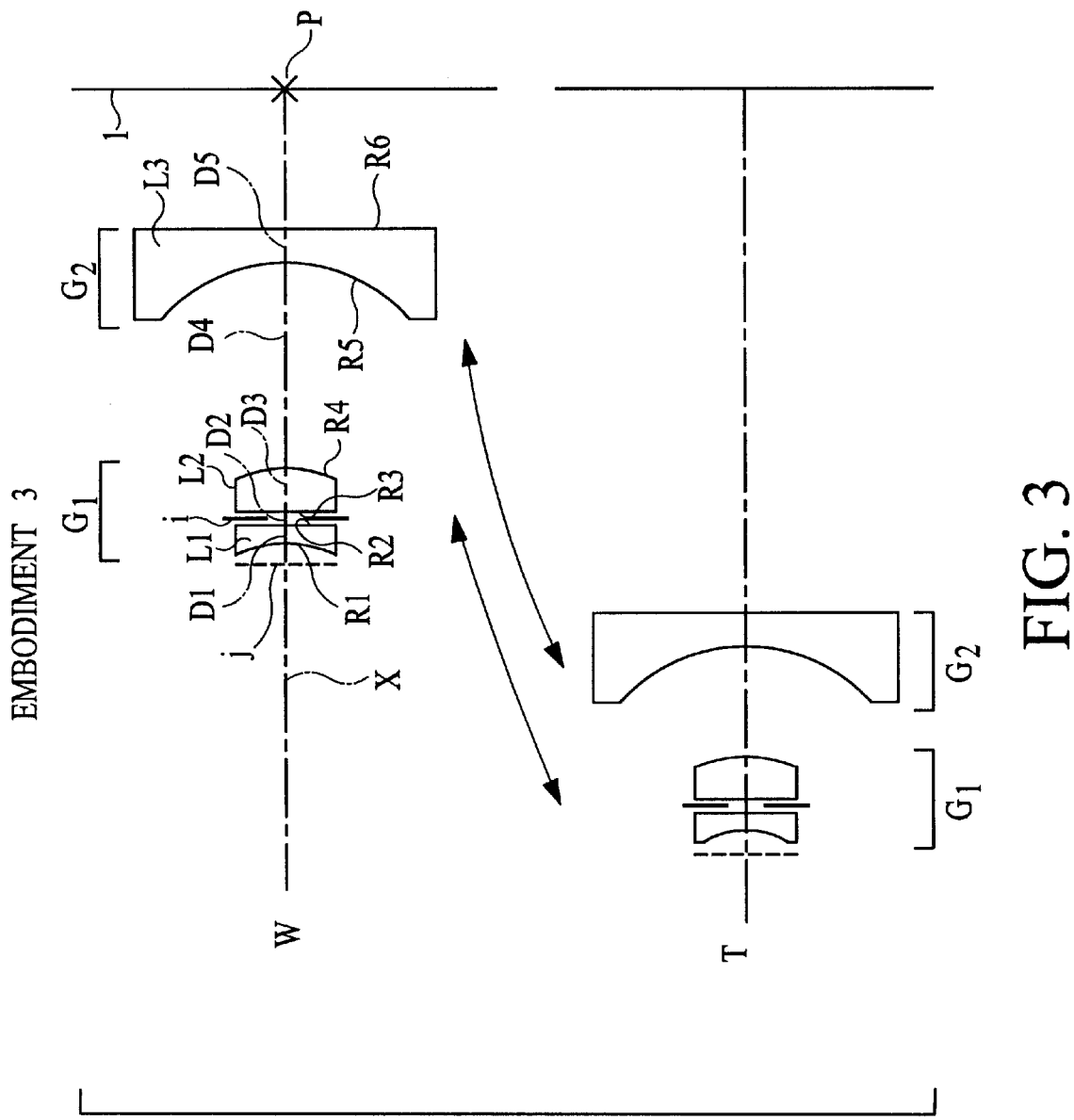
FIG. 3 is a schematic diagram illustrating the basic lens structure in the maximum wide-angle state and the maximum telephoto state, as well as the movement path of the lens groups of embodinent 3 of the present invention.
Figure 4:
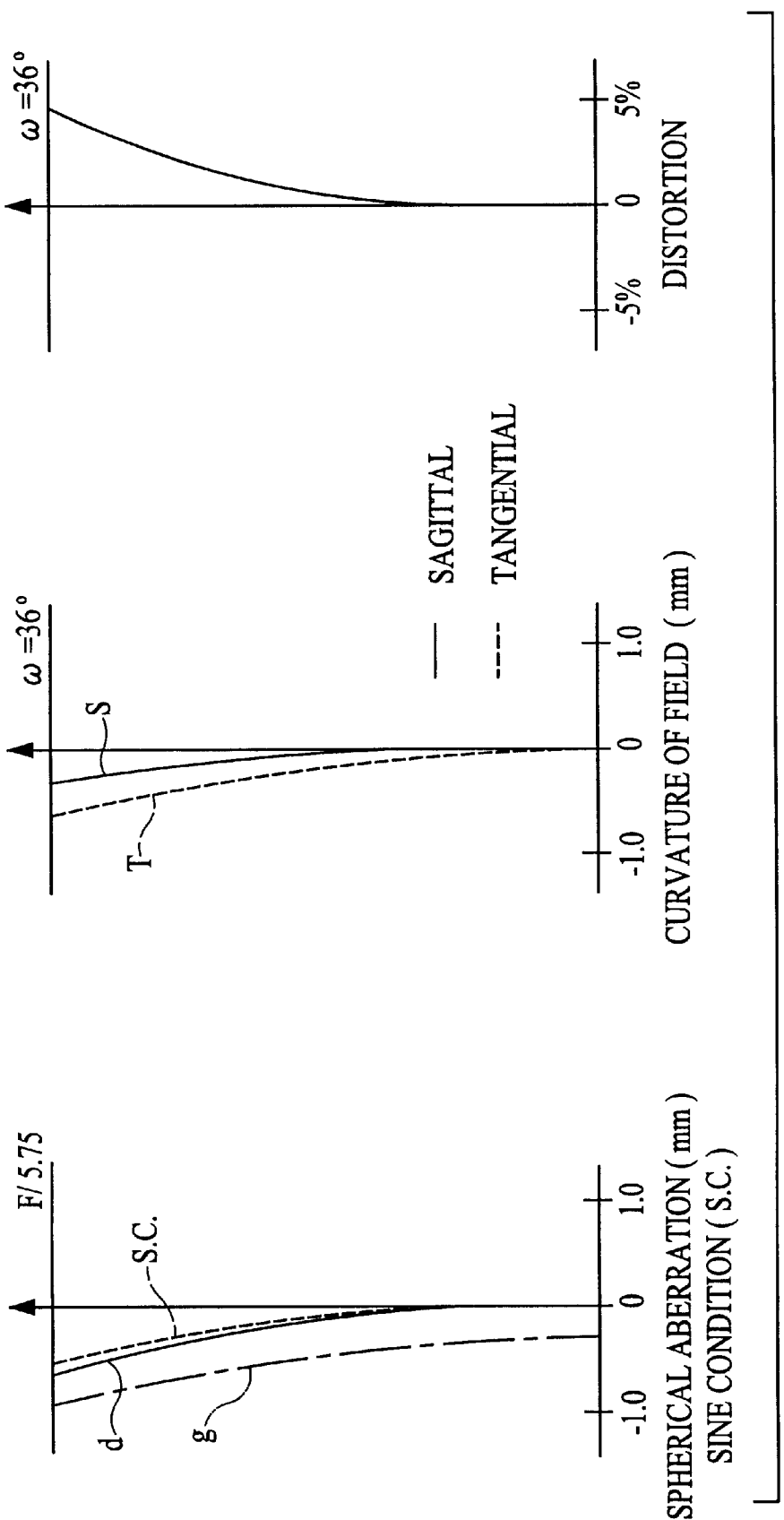
FIG. 4 illustrates the spherical aberration, curvature of field, and distortion of the zoom lens of embodiment 1 at the maximum wide-angle state.
Figure 5:
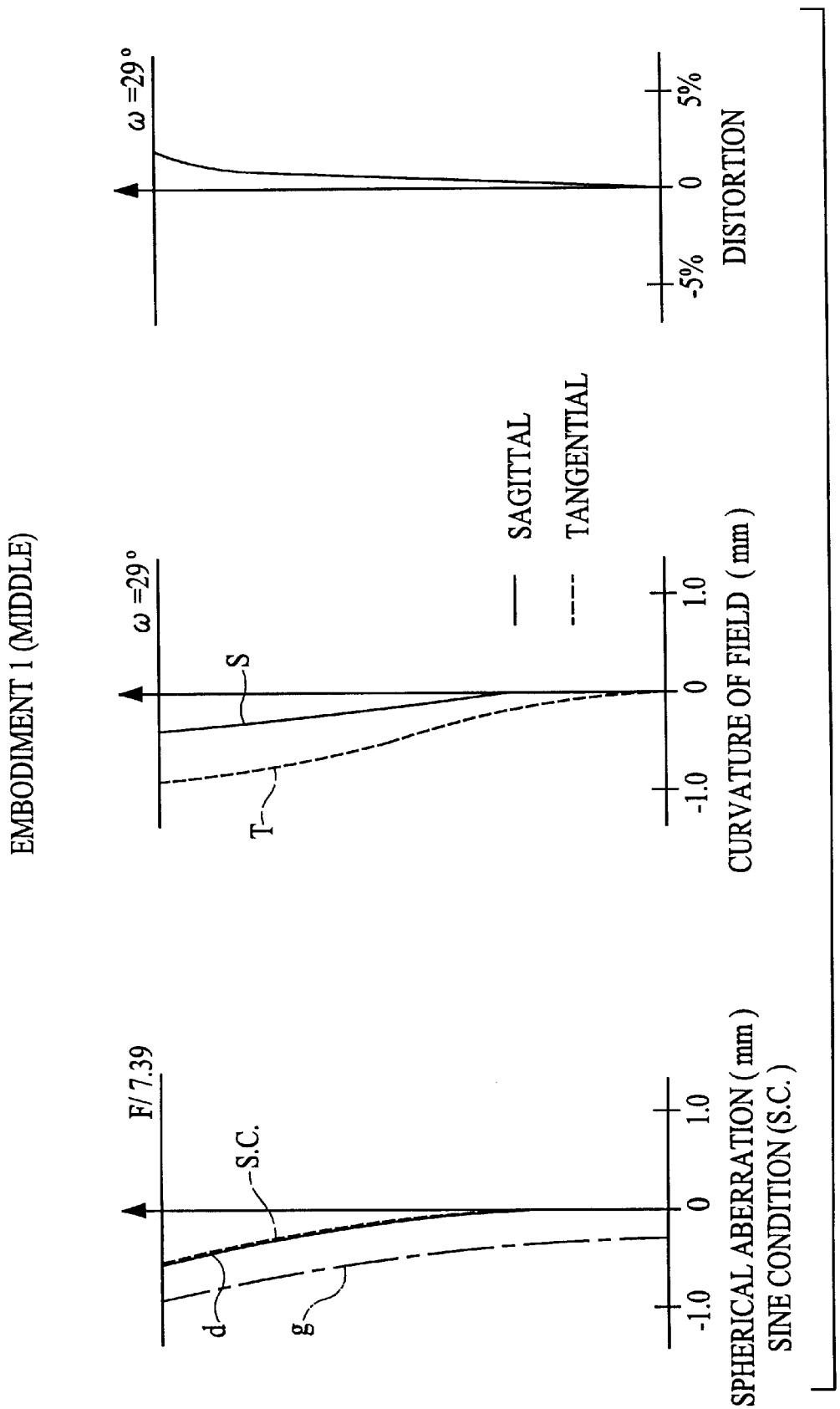
FIG. 5 shows the spherical aberration, curvature of field, and distortion of the zoom lens of embodiment 1 at an intermediate state (Middle)
Figure 6:
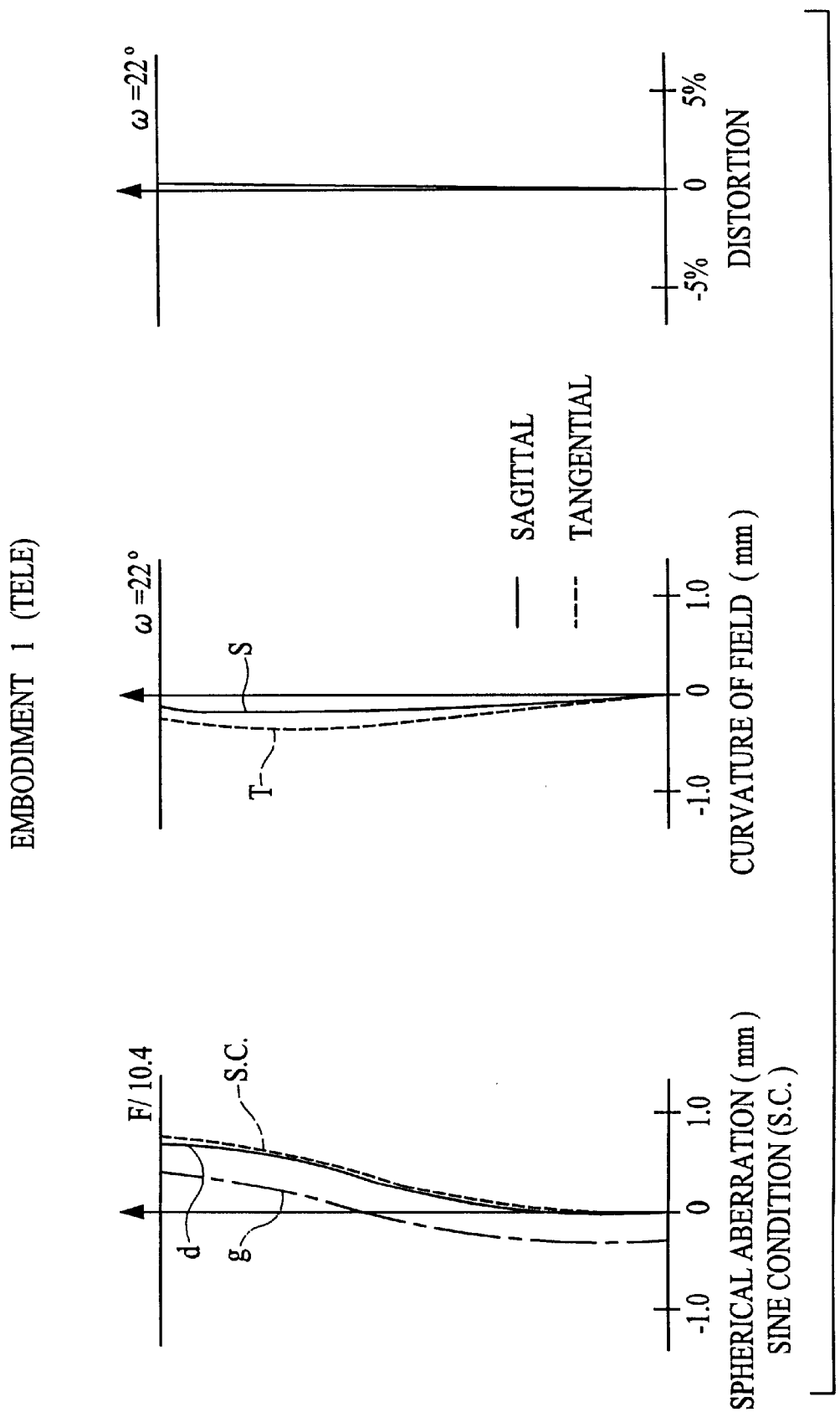
FIG. 6 shows the spherical aberration, curvature of field, and distortion of the lens of embodiment 1 at the maximum telephoto state.
Figure 7:
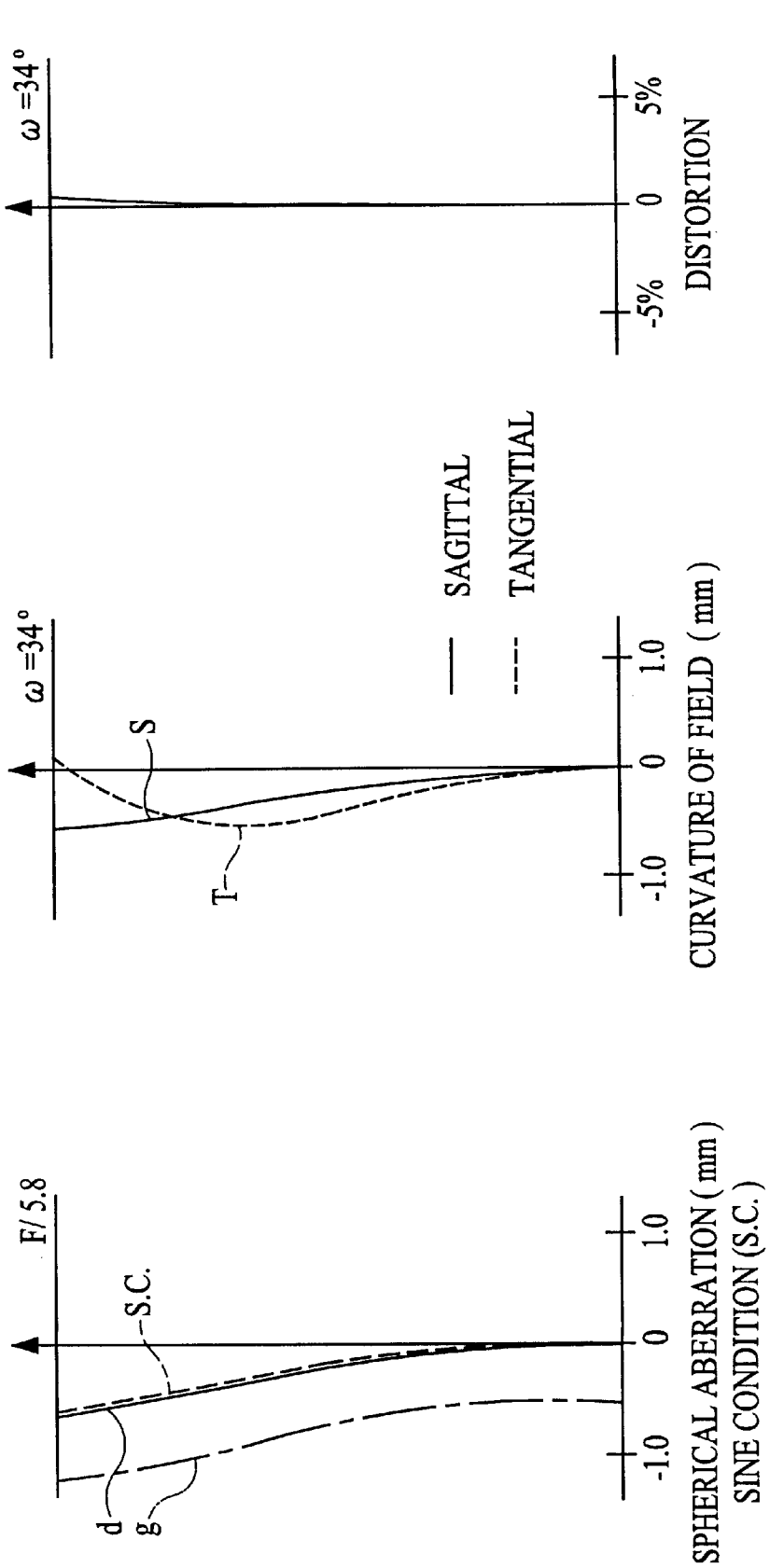
FIG. 7 illustrates the spherical aberration, curvature of field, and distortion of the lens of embodiment 2 at the maximum wide-angle state.
Figure 8:
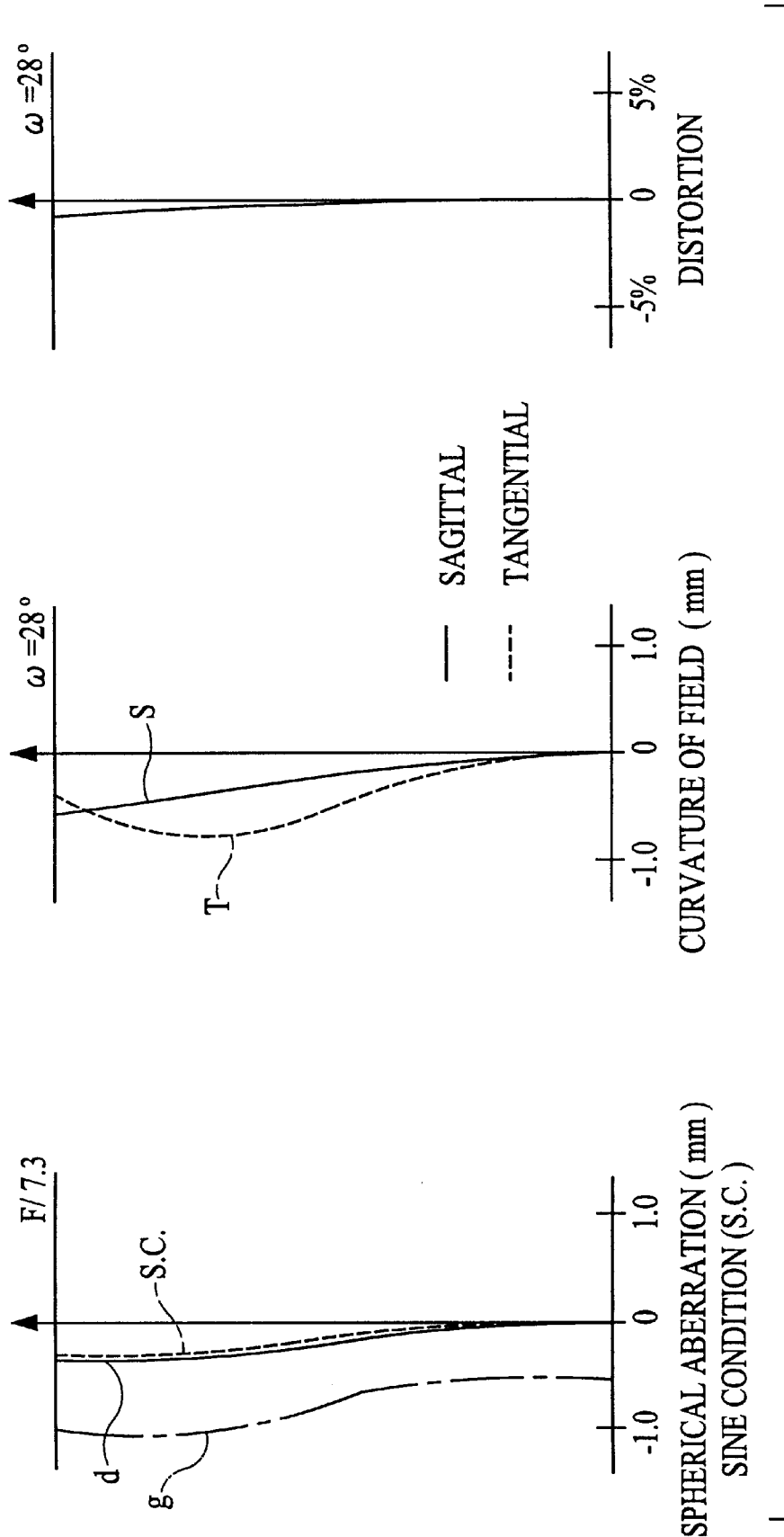
FIG. 8 illustrates the spherical aberration, curvature of field, and distortion of the lens of embodiment 2 at an intermediate state.
Figure 9:
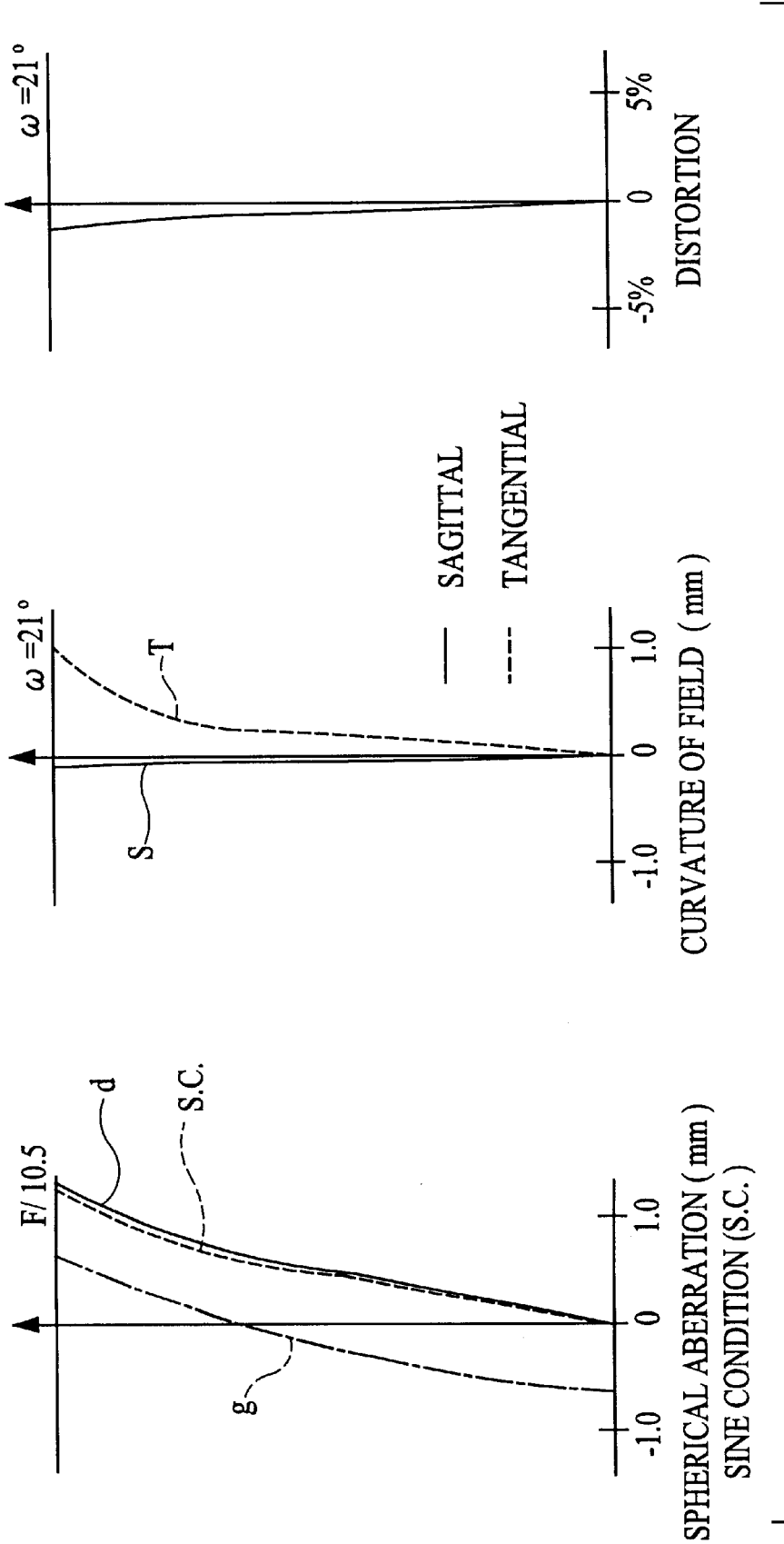
FIG. 9 illustrates the spherical aberration, curvature of field, and distortion of the lens of embodiment 2 at the maximum telephoto state.
Figure 10:
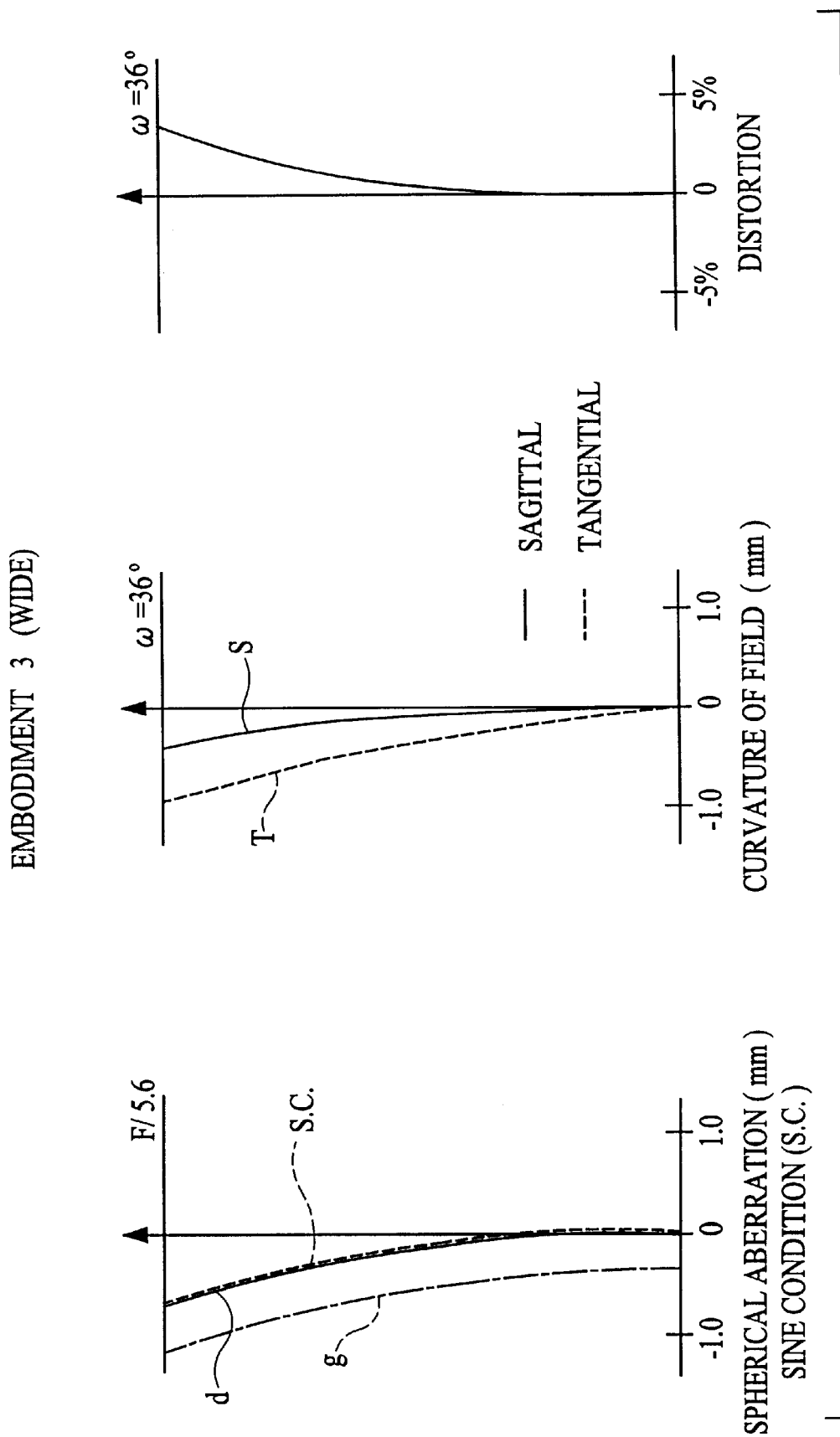
FIG. 10 illustrates the spherical aberration, curvature of field, and distortion of the lens of embodiment 3 at the maximum wide-angle state.
Figure 11:
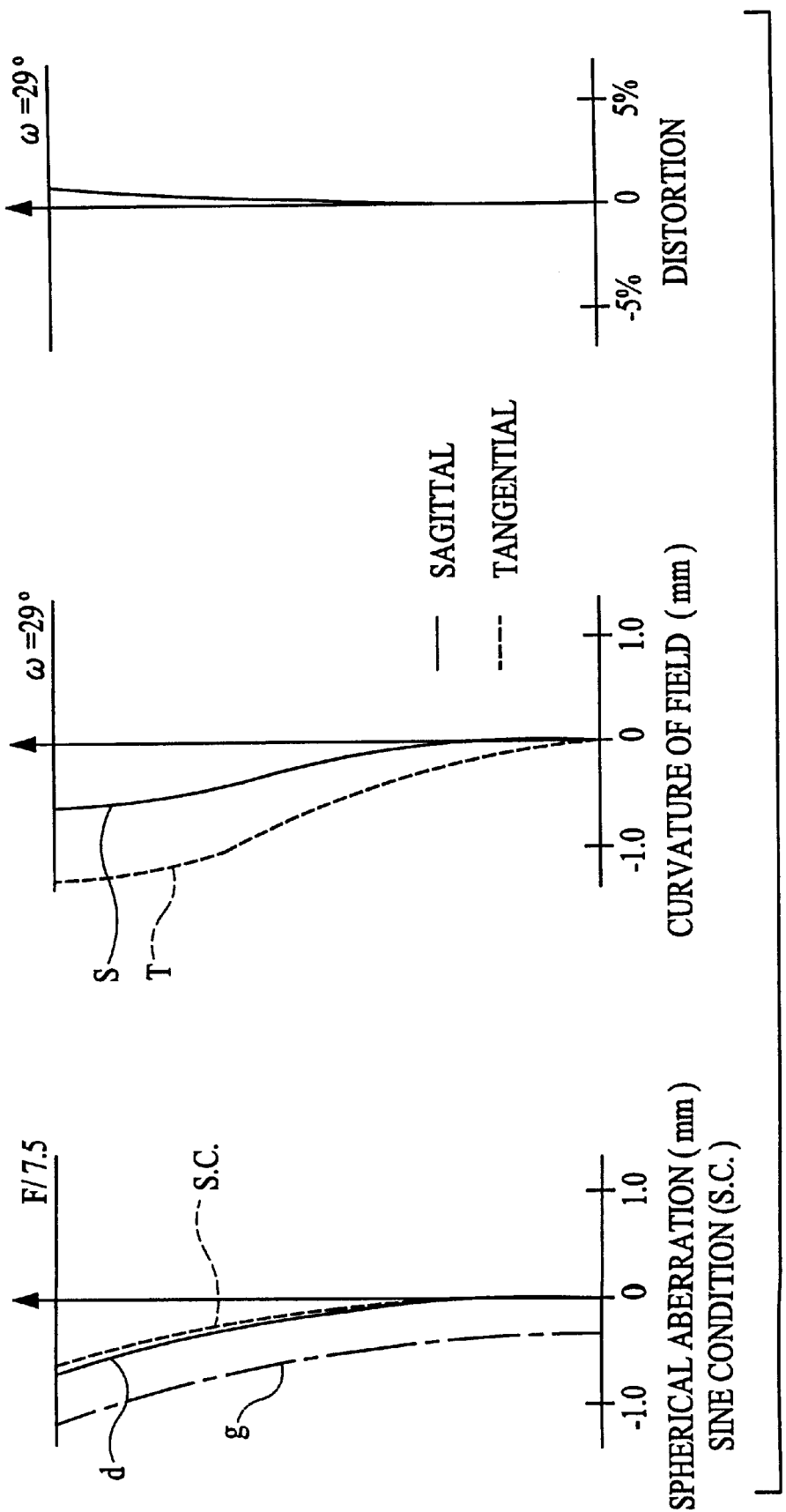
FIG. 11 illustrates the spherical aberration, curvature of field, and distortion of the lens of embodiment 3 at an intermediate state; and, FIG. 12 illustrates the spherical aberration, curvature of field, and distortion of the lens of embodiment 3 at the maximum telephoto state.
Figure 12:
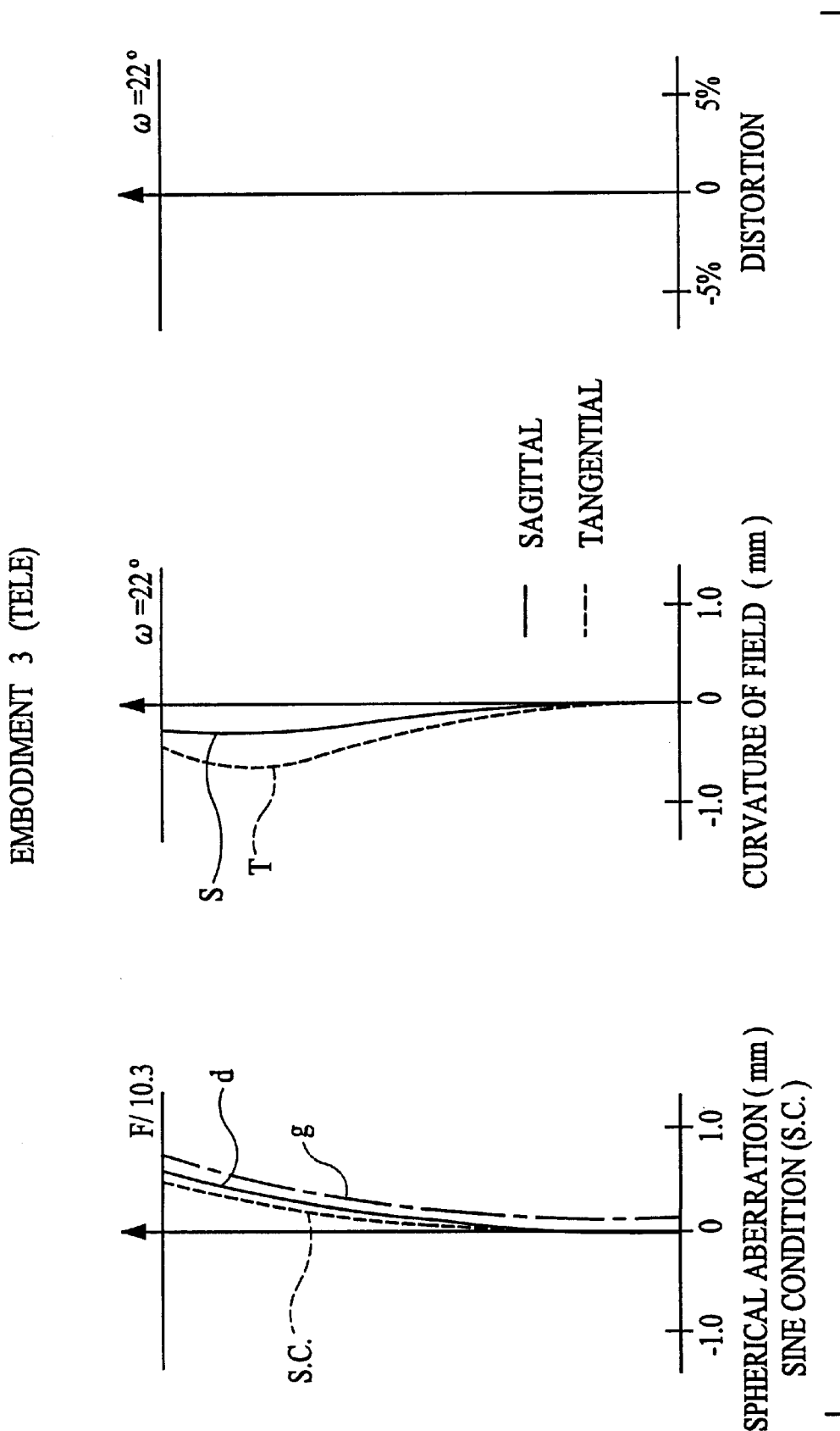

FIGS. 1–3 illustrate the basic lens structure at the maximum wide-angle state (W) and a the maximum telephoto state (T) of each of embodiments 1–3, respectively. In each figure, the movement path of each lens group between these two states is described.

Each zoom lens in these embodiments comprises a front lens group $G_1$ and a rear lens group $G_2$, as shown in FIG. 1. The front lens group $G_1$ is composed of a negative lens element $L_1$ and a positive lens element $L_2$, while the rear lens group $G_2$ is composed of a single negative lens element $L_3$. Moreover, the negative lens element $L_1$ in the first two embodiments is a meniscus lens with its concave surface on the object-side. In embodiment 3, a biconcave lens element is used instead, with a surface of stronger curvature on the object-side, the positive lens element $L_2$ is a biconvex lens with a surface of stronger curvature on the image-side, and the negative lens element $L_3$ is a biconcave lens with a surface of stronger curvature on the object-side. Moreover, in this embodiment, a fixed stop "i" is arranged between the negative lens element $L_1$ and the positive lens element $L_2$, and a variable stop "j" is arranged immediately adjacent the object-side of negative lens element $L_1$. In each embodiment, the front lens group $G_1$ and the rear lens group $G_2$ move along the optical axis X and the distance between these lens groups is changed during zooming. These lens groups are positioned during zooming so as to form excellent images, at arbitrary positions of the object, onto imaging surface P.

Also, the object-side surface of the negative lens element $L_1$ (and, in embodiment 1, the object-side of the positive lens element $L_2$ as well) is made to be aspherical.

Each of the embodiments 1–3 will now be described with specific numerical values being given.

Embodiment 1

Table 1 gives the values of the radius of curvature R (in mm) of each lens element surface, the on-axs surface spacing D (in mm), as well as the values of the index of refraction $n_d$ and the Abbe number $v_d$ (for the sodium d line) of each lens element of the lens which apply to embodiment 1. The surface numbers (#) in the table indicate the surface order from the photographic object-side.

TABLE 1

| # | R | D | $n_d$ | $v_d$ |
|---|---|---|---|---|
| 1 | −17.716* | 1.95 | 1.58364 | 30.3 |
| 2 | −333.515 | 0.97 | | |
| 3 | 65.557* | 3.53 | 1.49023 | 57.6 |
| 4 | −7.544 | 14.878 (W) | | |
| | | 11.465 (M) | | |
| | | 7.986 (T) | | |
| 5 | −11.676 | 2.38 | 1.49023 | 57.6 |
| 6 | 318.791 | | | |

A stop is located 0.90 mm from the second surface toward the image-side.

In addition, the surfaces with a * to the right of the surface radius in Table 1, above, are made to be aspheric, with an aspheric shape as indicated in equation (1) below.

$$Z = Cy^2/(1+(1-K\,C^2y^2)^{1/2}) + A_4 y^4 + A_6 y^6 + A_8 y^8 + A_{10} y^{10} \quad \text{Equation (1)}$$

where

Z is the distance (in mm) of the point on the aspherical surface from the tangential plane at the lens element surface vertex, C is the curvature (=1/R) of the aspherical surface vertex y is the height (in mm) from the optical axs, K is the eccentricity (i.e., the conical constant), and $A_4$, $A_6$, $A_8$, $A_{10}$ are the coefficient constants of the 4th, 6th, 8th, and 10th exponential number terms, respectively, for the aspheric surface.

In Table 2 below, the values for each of the constants C, K, $A_4$, $A_6$, $A_8$ and $A_{10}$ of Equation 1 above, are given for the aspheric surfaces indicated by a * in Table 1.

TABLE 2

| # | C | K | $A_4$ | $A_6$ | $A_8$ | $A_{10}$ |
|---|---|---|---|---|---|---|
| 1 | 0.056446 | 14.692 | −2.1027 × 10⁻⁴ | 1.3823 × 10⁻⁹ | −4.0070 × 10⁻¹⁵ | −1.1121 × 10⁻¹⁹ |
| 3 | 0.015254 | 0.89835 | −5.1857 × 10⁻⁶ | 1.3140 × 10⁻⁸ | 8.8089 × 10⁻¹³ | 0.0 |

Additionally, the values of the effective focal length f', the back focus l', the distance $D_4$ between lens groups, the field angle 2 ω, and the F number $F_{NO}$ at the maximum wide-angle state W, an intermediate state M, and the maximum telephoto state T for embodiment 1 are as described in Table 3.

TABLE 3

| | W | M | T |
|---|---|---|---|
| f' | 29.840 | 38.368 | 54.139 |
| l' | 9.756 | 19.368 | 37.617 |
| lens group spacing ($D_4$) | 14.878 | 11.465 | 7.986 |
| 2ω | 71.9° | 58.8° | 43.6° |
| $F_{NO}$ | 5.75 | 7.39 | 10.43 |

The values of $f_2/f_w$, $D_2/f_w$, $R_4/R_3$ and $R_5/f_w$ are respectively, 0.4698, 0.0325, −0.1151, and −0.391, and all the conditional formulas (1)–(4), above, are satisfied. Moreover, in Table 4, the focal distance $f_F$ of the front lens group, the length $D_F$ of front lens group (the length from the surface closest to the object-side to the surface closest to the image-side) and the focal distances $f_1$, $f_2$ and $f_3$ of each lens element are described.

TABLE 4

| | | |
|---|---|---|
| $f_F$ = 19.99 | $f_3$ = −23.82 | $D_2/f_w$ = 0.0325 |
| $f_1$ = −32.13 | $D_F$ = 6.45 | $R_4/R_3$ = −0.1151 |
| $f_2$ = 14.02 | $f_2/f_w$ = 0.4698 | $R_5/f_w$ = −0.391 |

Embodiment 2

Table 5 gives the values of the radius of curvature R (in mm) of each lens element surface, the on-axs surface spacing D (in mm), as well as the values of the index of refraction $n_d$ and the Abbe number $v_d$ (for the sodium d line) of each lens element of the lens which apply to embodiment 2. The surface numbers (#) in the table indicate the surface order from the photographic object-side, and the surface with a * to the right of the surface radius in Table 5, below, is made to be aspheric, with an aspheric shape as indicated in equation (1) above.

TABLE 5

| # | R | D | $n_d$ | $v_d$ |
|---|---|---|---|---|
| 1 | −15.898* | 2.60 | 1.58364 | 30.3 |
| 2 | −46.690 | 0.58 | | |
| 3 | 449.550 | 3.59 | 1.49023 | 57.6 |
| 4 | −7.717 | 13.428 (W) | | |
| | | 10.0 (M) | | |
| | | 6.000 (T) | | |
| 5 | −12.836 | 2.13 | 1.49023 | 57.6 |
| 6 | 2554.350 | | | |

A stop is located 0.50 mm from the second surface toward the image-side. Moreover, the aspherical coefficients for aspherical surface 1, above, are as described in Table 6 below.

TABLE 6

| # | C | K | $A_4$ | $A_6$ | $A_8$ | $A_{10}$ |
|---|---|---|---|---|---|---|
| 1 | −0.062901 | 12.35691 | −1.0364 × 10⁻⁴ | 4.7437 × 10⁻¹⁰ | −3.8889 × 10⁻¹⁵ | −5.4394 × 10⁻²⁰ |

Additionally, the focal distance f', the back focus l', the lens group spacing $D_4$, the field angle 2 ω, and the F number $F_{NO}$ at the maximum wide-angle state W, an intermediate state M and the maximum telephoto state T of embodiment 2 are as described in Table 7.

TABLE 7

| | W | M | T |
|---|---|---|---|
| f' | 31.742 | 39.985 | 57.367 |
| l' | 13.327 | 23.920 | 46.260 |
| lens group spacing ($D_4$) | 13.428 | 10.000 | 6.000 |
| 2ω | 68.6° | 56.8° | 41.3° |
| $F_{NO}$ | 5.80 | 7.3 | 10.5 |

The values of $f_2/f_w$, $D_2/f_w$, $R_4/R_3$ and $R_5/f_w$ are respectively, 0.4890, 0.018, −0.0172, and −0.404, and all the conditional formulas (1)–(4) above are satisfied. Moreover, in Table 8, the focal distance $f_F$ of the front lens group, the length $D_F$ of the front lens group (the length from the surface closest to the object-side to the surface closest to the image-side) and focal distances $f_1$, $f_2$ and $f_3$ of each lens element are described.

TABLE 8

| | | |
|---|---|---|
| $f_F$ = 20.27 | $f_3$ = −26.18 | $D_2/f_w$ = 0.018 |
| $f_1$ = −42.63 | $D_F$ = 6.77 | $R_4/R_3$ = −0.0172 |
| $f_2$ = 15.52 | $f_2/f_w$ = 0.489 | $R_5/f_w$ = −0.404 |

Embodiment 3

Table 9 gives the values of the radius of curvature R (in mm) of each lens element surface, the on-axis surface spacing D (in mm), as well as the values of the index of refraction $n_d$ and the Abbe number $v_d$ (for the sodium d line) of each lens element of the lens which apply to embodiment 3. The surface numbers (#) in the table indicate the surface order from the photographic object-side, and the surface with a * to the right of the surface radius in Table 9, below, is made to be aspheric, with an aspheric shape as indicated in equation (1) above.

TABLE 9

| # | R | d | $n_d$ | $v_d$ |
|---|---|---|---|---|
| 1 | −17.305* | 2.03 | 1.58364 | 30.3 |
| 2 | 186.209 | 1.00 | | |
| 3 | 48.986 | 3.15 | 1.49023 | 57.6 |
| 4 | −7.414 | 15.574 (W) | | |
| | | 11.499 (M) | | |
| | | 8.010 (T) | | |
| 5 | −12.436 | 2.38 | 1.49023 | 57.6 |
| 6 | 299.178 | | | |

A stop is located 0.90 mm from the second surface toward the image-side.
Moreover, the aspherical coefficients for aspherical surface 1, above, are as described in Table 10, below.

TABLE 10

| # | C | K | $A_4$ | $A_6$ | $A_8$ | $A_{10}$ |
|---|---|---|---|---|---|---|
| 1 | −0.057787 | 14.95612 | −2.0596 × 10⁻⁴ | 1.3181 × 10⁻⁹ | −5.4438 × 10⁻¹⁵ | −1.2416 × 10⁻¹⁹ |

Additionally, the focal distance f', the back focus l', the lens group spacing $D_4$, the field angle 2 ω, and the F number $F_{NO}$ at the maximum wide-angle state W, an intermediate state M and the maximum telephoto state T of embodiment 3 are as described in Table 11, below.

TABLE 11

| | W | M | T |
|---|---|---|---|
| f' | 29.731 | 39.320 | 54.320 |
| l' | 9.497 | 20.889 | 38.710 |
| lens group spacing ($D_4$) | 15.574 | 11.499 | 3.010 |
| 2ω | 72.1° | 57.6° | 43.4° |
| $F_{NO}$ | 5.65 | 7.48 | 10.33 |

The values of $f_2/f_w$, $D_2/f_w$, $R_4/R_3$ and $R_5/f_w$ are, respectively, 0.450, 0.0336, −0.1513, and −0.418, and all the conditional formulas (1)–(4) above are satisfied. Moreover, in Table 12, the focal distance $f_F$ of the front group, the length of the front lens group $D_F$ (the length from the surface closest to the object-side to the surface closest to the image-side) and focal distances $f_1$, $f_2$ and $f_3$ of each lens are described.

TABLE 12

| $f_F = 20.45$ | $f_3 = -25.37$ | $D_2/f_w = 0.0336$ |
|---|---|---|
| $f_1 = -27.03$ | $D_F = 6.18$ | $R_4/R_3 = -0.1513$ |
| $f_2 = 13.38$ | $f_2/f_w = 0.450$ | $R_5/f_w = -0.418$ |

Moreover, the spherical aberration, curvature of field, and distortion at the maximum wide-angle state (WIDE), an intermediate state (MIDDLE) and the maximum telephoto state (TELE) of embodiments 1–3 is described in FIGS. 4–12, respectively. In these aberration graphs, ω represents the half-field angle, S.C. represents the sine condition, d represents the sodium d-line, g represents the sodium g-line, S represents the sagittal rays, and T represents the tangential rays. It is clear from FIGS. 4–12 that each aberration is acceptably low in the present embodiments.

As described above, the zoom lens of the present invention is a zoom lens having two lens groups, (a positive group and a negative group) which are inexpensive, compact and appropriate for production with excellent imaging performance even near the perimeter of the image field, making it an ideal zoom lens for compact cameras. The invention being thus described, it will be obvious that the same may be varied in many ways. Such variations are not to be regarded as a departure from the spirit and scope of the invention. For example, rather than the aspheric surface or surfaces being formed by figuring a spherical surface, these surfaces may be formed directly by spin casting or using a mold or die. All such modifications as would be obvious to one skilled in the art are intended to be included within the scope of the following claims.

What is claimed is:

1. A zoom lens comprising, in order from the object-side:
   a front lens group having positive refractive power, said front lens group including a negative lens element with a concave aspherical surface on the object-side, a positive lens element with a convex surface on the image-side, and a stop arranged between said negative lens element and said positive lens element; and
   a rear lens group having negative refractive power, said rear lens group consisting of a negative lens element having a concave surface on the object-side;
   wherein the following conditional formulas (1)–(3) are satisfied:

$$0.40 < f_2/f_w < 0.50 \quad (1)$$

$$0.01 < D_2/f_w < 0.05 \quad (2)$$

$$-0.20 < R_4/R_3 < 0.0 \quad (3)$$

where
   $f_2$ is the focal distance of the positive lens element in the front lens group,
   $f_w$ is the focal distance of the zoom lens at the maximum wide-angle state,
   $D_2$ is the distance between the facing surfaces of the negative lens element and the positive lens element in the front lens group,
   $R_3$ is the radius of curvature of the object-side surface of the positive lens element in the front lens group, and
   $R_4$ is the radius of curvature of the image-side surface of the positive lens element in the front lens group.

2. The zoom lens according to claim 1, wherein both surfaces of the negative lens element in the rear lens group are spherical surfaces, and the radius of curvature of the object-side surface $R_5$ of the negative lens element of said rear lens group and the focal length of the zoom lens at the maximum wide-angle state $f_w$ satisfy the following conditional formula:

$$-0.45 < R_5/f_w < -0.35.$$

3. The zoom lens according to claim 1, wherein all of the lens elements are made of organic material.

4. The zoom lens according to claim 2, wherein all of the lens elements are made of organic material.

5. The zoom lens according to claim 1, said stop being a fixed stop, and further including a variable stop arranged at the immediate object-side of the negative lens element in said front lens group.

6. The zoom lens according to claim 2, said stop being a fixed stop, and further including a variable stop arranged at the immediate object-side of the negative lens element in said front lens group.

7. The zoom lens according to claim 3, said stop being a fixed stop, and further including a variable stop arranged at the immediate object-side of the negative lens element in said front lens group.

8. The zoom lens according to claim 1, said zoom lens further satisfying the construction parameters as set forth in the following table:

| # | R | D | $n_d$ | $v_d$ |
|---|---|---|---|---|
| 1 | −17.716 | 1.95 | 1.58364 | 30.3 |
| 2 | −333.515 | 0.97 | | |
| 3 | 65.557 | 3.53 | 1.49023 | 57.6 |
| 4 | −7.544 | 14.878 (W) | | |
|   |  | 11.465 (M) | | |
|   |  | 7.986 (T) | | |
| 5 | −11.676 | 2.38 | 1.49023 | 57.6 |
| 6 | 318.791 | | | | where
   # is the surface number from the photographic object-side, R is the radius of curvature (in mm) of each lens element surface, D is the on-axis surface spacing (in mm), $n_d$ is the index of refraction and $v_d$ is the Abbe number (each for the sodium d line) of each lens element, W denotes the maximum wide-angle state, M denotes an intermediate state, and T denotes the maximum telephoto state, and wherein surfaces 1 and 3 are further figured so as to be aspheric.

9. The zoom lens according to claim 1, said zoom lens further satisiying the construction parameters as set forth in the following table:

| # | R | D | $n_d$ | $v_d$ |
|---|---|---|---|---|
| 1 | −15.898 | 2.60 | 1.58364 | 30.3 |
| 2 | −46.690 | 0.58 | | |
| 3 | 449.550 | 3.59 | 1.49023 | 57.6 |
| 4 | −7.717 | 13.428 (W) | | |
|   |  | 10.0 (M) | | |
|   |  | 6.000 (T) | | |
| 5 | −12.836 | 2.13 | 1.49023 | 57.6 |
| 6 | 2554.350 | | | | where
# is the surface number from the photographic object-side, R is the radius of curvature (in mm) of each lens element surface, D is the on-axis surface spacing (in mm), $n_d$ is the index of refraction and $v_d$ is the Abbe number (each for the sodium d line) of each lens element, W denotes the maximum wide-angle state, M denotes an intermediate state, and T denotes the maximum telephoto state, and wherein surface 1 is further figured so as to be aspheric.

10. The zoom lens according to claim 1, and more particularly, having construction parameters as set forth in the following table:

| # | R | D | $n_d$ | $v_d$ |
|---|---|---|---|---|
| 1 | −17.305 | 2.03 | 1.58364 | 30.3 |
| 2 | 186.209 | 1.00 | | |
| 3 | 48.986 | 3.15 | 1.49023 | 57.6 |

-continued

| # | R | D | $n_d$ | $v_d$ |
|---|---|---|---|---|
| 4 | −7.414 | 15.574 (W) | | |
|   |        | 11.499 (M) | | |
|   |        | 8.010 (T)  | | |
| 5 | −12.436 | 2.38 | 1.49023 | 57.6 |
| 6 | 299.178 | | | | where
# is the surface number from the photographic object-side, R is the radius of curvature (in mm) of each lens element surface, D is the on-axis surface spacing (in mm), $n_d$ is the index of refraction and $v_d$ is the Abbe number (each for the sodium d line) of each lens element, W denotes the maximum wide-angle state, M denotes an intermediate state, and T denotes the maximum telephoto state, and wherein surface 1 is further figured so as to be aspheric.

* * * * *

UNITED STATES PATENT AND TRADEMARK OFFICE
CERTIFICATE OF CORRECTION

PATENT NO : 5,995,298
DATED : Nov. 30, 1999
INVENTOR(S): OHNO

It is certified that error appears in the above-identified patent and that said Letters Patent is hereby corrected as shown below:

```
In the ABSTRACT, at line 19, "acing" should be --facing--.
In column 2, line 43, "L3" should be -- L_3--.
In column 2, line 46, "L2" should be --L_2--.
In column 4, line 44 "for is the" should be -- for the --.
In column 6, line 13, "imagig" should be -- imaging --.
In TABLE 11, right column, third row, "3.010" should be --8.010
```

Signed and Sealed this

Twenty-third Day of May, 2000

Attest:

Q. TODD DICKINSON

Attesting Officer                Director of Patents and Trademarks